US006868087B1

(12) United States Patent
Agarwala et al.

(10) Patent No.: US 6,868,087 B1
(45) Date of Patent: Mar. 15, 2005

(54) REQUEST QUEUE MANAGER IN TRANSFER CONTROLLER WITH HUB AND PORTS

(75) Inventors: Sanjive Agarwala, Richardson, TX (US); Iain Robertson, Bedfordshire (GB); David A. Comisky, Plano, TX (US); Charles L. Fuoco, Allen, TX (US); Christopher L. Mobley, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 847 days.

(21) Appl. No.: 09/713,609

(22) Filed: Nov. 15, 2000

Related U.S. Application Data

(60) Provisional application No. 60/169,451, filed on Dec. 7, 1999.

(51) Int. Cl.[7] .......................... H04L 12/28; H04B 7/212
(52) U.S. Cl. ....................................... 370/412; 370/444
(58) Field of Search ................................ 370/412, 414, 370/416, 417, 418, 423, 429, 433, 438, 444, 450, 455

(56) References Cited

U.S. PATENT DOCUMENTS

| | | | | |
|---|---|---|---|---|
| 5,519,701 A | * | 5/1996 | Colmant et al. ............ 370/412 |
| 5,566,171 A | * | 10/1996 | Levinson ..................... 370/352 |
| 5,598,406 A | * | 1/1997 | Albrecht et al. ............ 370/296 |
| 6,105,095 A | * | 8/2000 | Miller et al. ................ 710/107 |
| 6,122,680 A | * | 9/2000 | Holm et al. .................. 710/52 |
| 6,160,812 A | * | 12/2000 | Bauman et al. ............ 370/416 |
| 6,182,177 B1 | * | 1/2001 | Harriman .................... 710/112 |
| 6,185,221 B1 | * | 2/2001 | Aybay ........................ 370/412 |
| 6,442,634 B2 | * | 8/2002 | Bronson et al. ............ 710/260 |
| 6,463,032 B1 | * | 10/2002 | Lau et al. ................... 370/218 |
| 6,570,873 B1 | * | 5/2003 | Isoyama et al. ............ 370/375 |

* cited by examiner

Primary Examiner—Andy Lee
(74) Attorney, Agent, or Firm—Robert D. Marshall, Jr.; W. James Brady, III; Fredrick J. Telecky, Jr.

(57) ABSTRACT

A transfer controller with hub and ports is viewed as a communication hub between the various locations of a global memory map. A request queue manager serves as a crucial part of the transfer controller. The request queue manager receives these data transfer request packets from plural transfer requests nodes. The request queue manager sorts transfer request packets by their priority level and stores them in the queue manager memory. The request queue manager processes dispatches transfer request packets to a free data channel based upon priority level and first-in-first-out within priority level.

19 Claims, 3 Drawing Sheets

US 6,868,087 B1

REQUEST QUEUE MANAGER IN TRANSFER CONTROLLER WITH HUB AND PORTS

This application claims priority under 35 USC §119(e)(1) of Provisional Application No. 60/169,451, filed Dec. 7, 1999.

TECHNICAL FIELD OF THE INVENTION

The technical field of this invention is digital signal processing and more particularly control of data transfers within a digital signal processing system.

BACKGROUND OF THE INVENTION

Digital signal processing (DSP) differs significantly from general purpose processing performed by micro-controllers and microprocessors. One key difference is the strict requirement for real time data processing. For example, in a modem application, it is absolutely required that every sample be processed. Even losing a single data point might cause a digital signal processor application to fail. While processing data samples may still take on the model of tasking and block processing common to general purpose processing, the actual data movement within a digital signal processor system must adhere to the strict real-time requirements of the system.

As a consequence, digital signal processor systems are highly reliant on an integrated and efficient direct memory access (DMA) engine. The direct memory access controller is responsible for processing transfer requests from peripherals and the digital signal processor itself in real time. All data movement by the direct memory access must be capable of occurring without central processing unit (CPU) intervention in order to meet the real time requirements of the system. That is, because the CPU may operate in a software tasking model where scheduling of a task is not as tightly controlled as the data streams the tasks operate on require, the direct memory access engine must sustain the burden of meeting all real time data stream requirements in the system.

The early direct memory access has evolved into several successive versions of centralized transfer controllers and more recently into the transfer controller with hub and ports architecture. The transfer controller with hub and ports architecture is described in U.S. Pat. No. 6,496,740 claiming priority from U.K. Patent Application No. 9901996.9 filed Apr. 10, 1999 entitled "TRANSFER CONTROLLER WITH HUB AND PORTS ARCHITECTURE."

A first transfer controller module was developed for the TMS330C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS320C80 is fundamentally different from a direct memory access in that only a single set of address generation and parameter registers is required. Prior direct memory access units required multiple sets for multiple channels. The single set of registers, however, can be utilized by all direct memory access requestors. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new ideas concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scaleable.

Finally the transfer controller with hub and ports includes a mechanism for queuing transfers up in a dedicated queue memory. The TMS320C80 transfer controller permitted only one transfer outstanding per processor at a time. Through the queue memory provided by the transfer controller with hub and ports, processors may issue numerous transfer requests up to the queue memory size before stalling the digital signal processor.

SUMMARY OF THE INVENTION

In a transfer controller with hub and ports, the request queue manager is the hub front-end which operates in conjunction with a transfer request bus to handle incoming requests. The queue manager control unit sorts these requests by their respective priorities and stores them in the queue manager memory. The queue manager memory could take several forms, but is preferably RAM based.

The queue manager memory is partitioned into multiple queues. Each queue represents a priority level with which access requests in that queue should be performed by the transfer controller hub. The number of channels in the request queue manager is highly scalable, and controlled via a set of queue bounds registers within the request queue manager. The queue manager also processes read requests from the transfer controller hub and supplies the next queued request to the hub on a per channel basis.

BRIEF DESCRIPTION OF THE DRAWINGS

These and other aspects of this invention are illustrated in the drawings, in which.

DETAILED DESCRIPTION OF THE INVENTION

The request queue manager function is a crucial part of the centralized transfer controller with hub and ports architecture. To understand its various performance aspects it is helpful to consider first the transfer controller as a whole.

Figure 1:
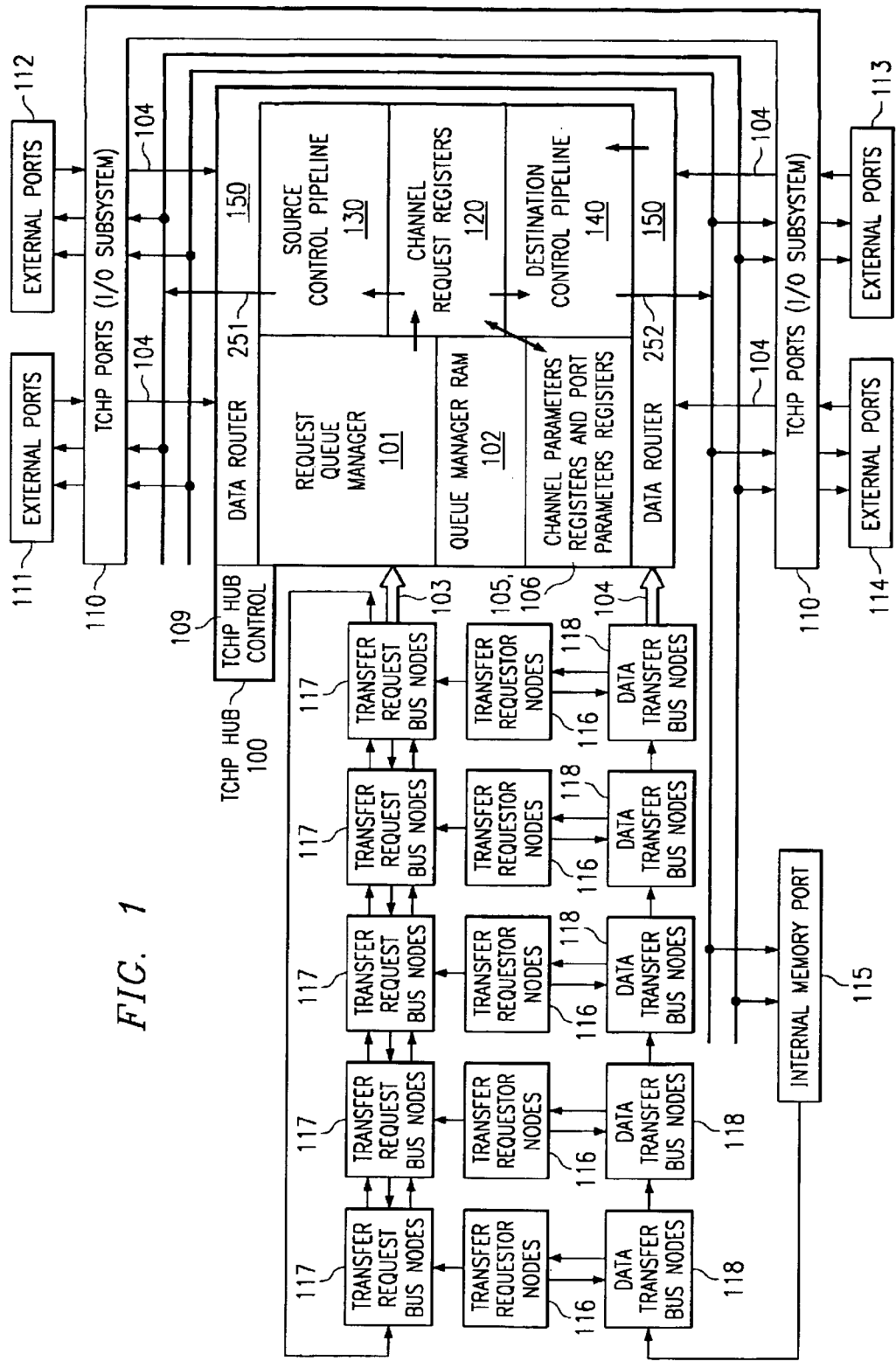
FIG. 1 illustrates in a functional block diagram, the basic principal features of the transfer controller with hub and ports.

The transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115. At the heart of the hub is the transfer controller with hub and ports hub control unit 109 which acts upon request and status information to direct the overall actions of the transfer controller.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requestor nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router unit 150. On a later cycle the destination control pipeline addresses port 114 and writes the data at port 114. External ports as described here do not initiate transfer requests but merely participate in reads and writes requested elsewhere on the chip. Read and write operations involving the processor-memory (transfer requestors) nodes 116 are initiated as transfer request packets on the transfer request bus 117. The queue manager 101 processes these as described above. On a later cycle a source pipeline output (read command/address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

Figure 2:
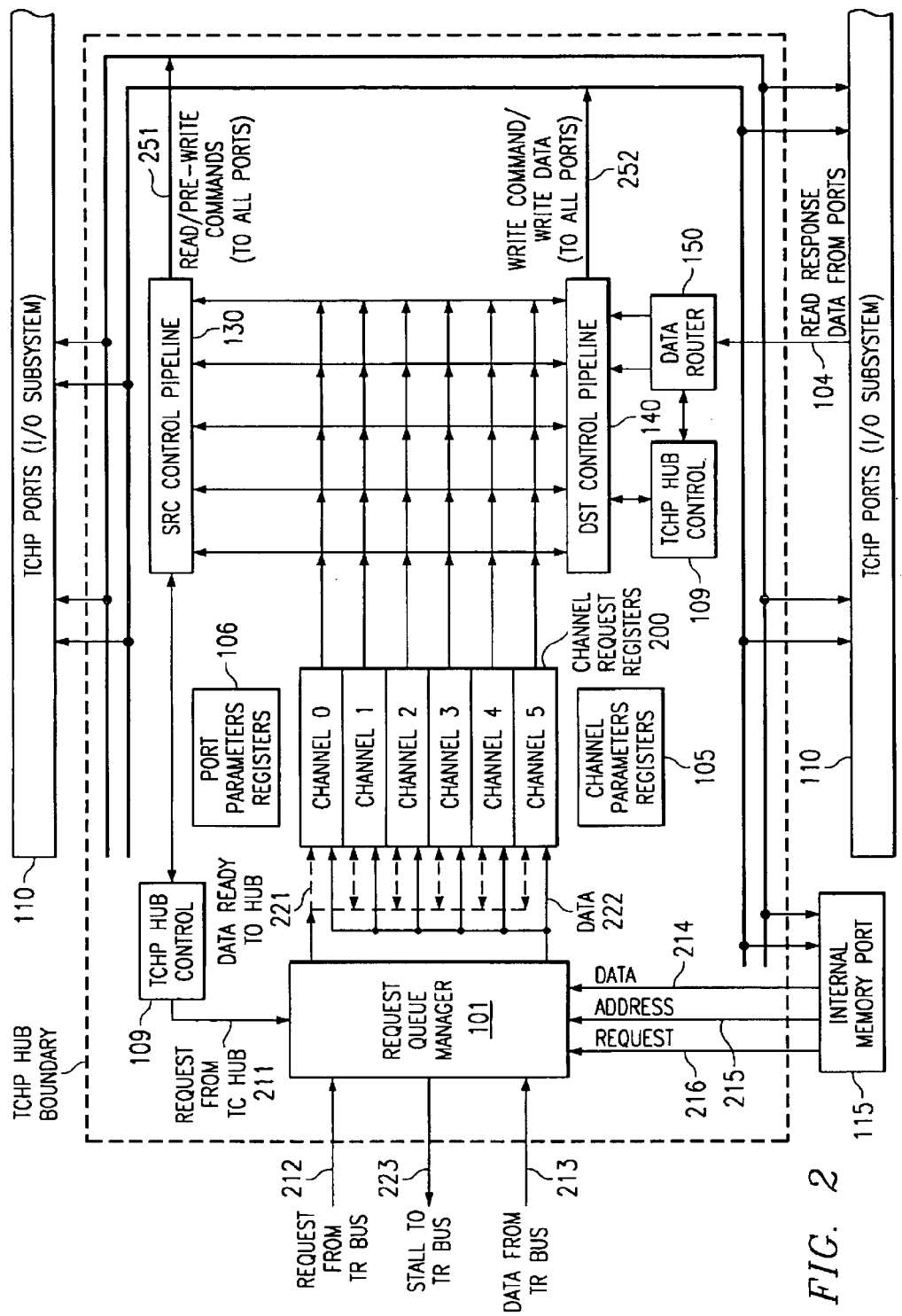
FIG. 2 illustrates the request queue manager interface to the transfer controller with hub and ports hub unit.

FIG. 2 illustrates the interface of request queue manager 101 to the transfer controller hub unit boundary and particularly the request queue manager communications with the channel request registers 200, channel parameters registers 105 and port parameters registers 106. Channel parameters registers 105 and port parameters registers 106 store critical data regarding for example, types of transfers, mode information, status, and much other information critical to the transfer process.

Channel request registers 200 pass information used in the source control pipeline 130 for generation of the read/pre-write commands 251. Similarly, channel request registers 200 pass information used in the destination control pipeline 140 for the generation of write command/write data words 252. Read response data 104 from the ports is returned to the destination pipeline via the data router unit 150.

Detailed View of the Queue Manager

Figure 3:
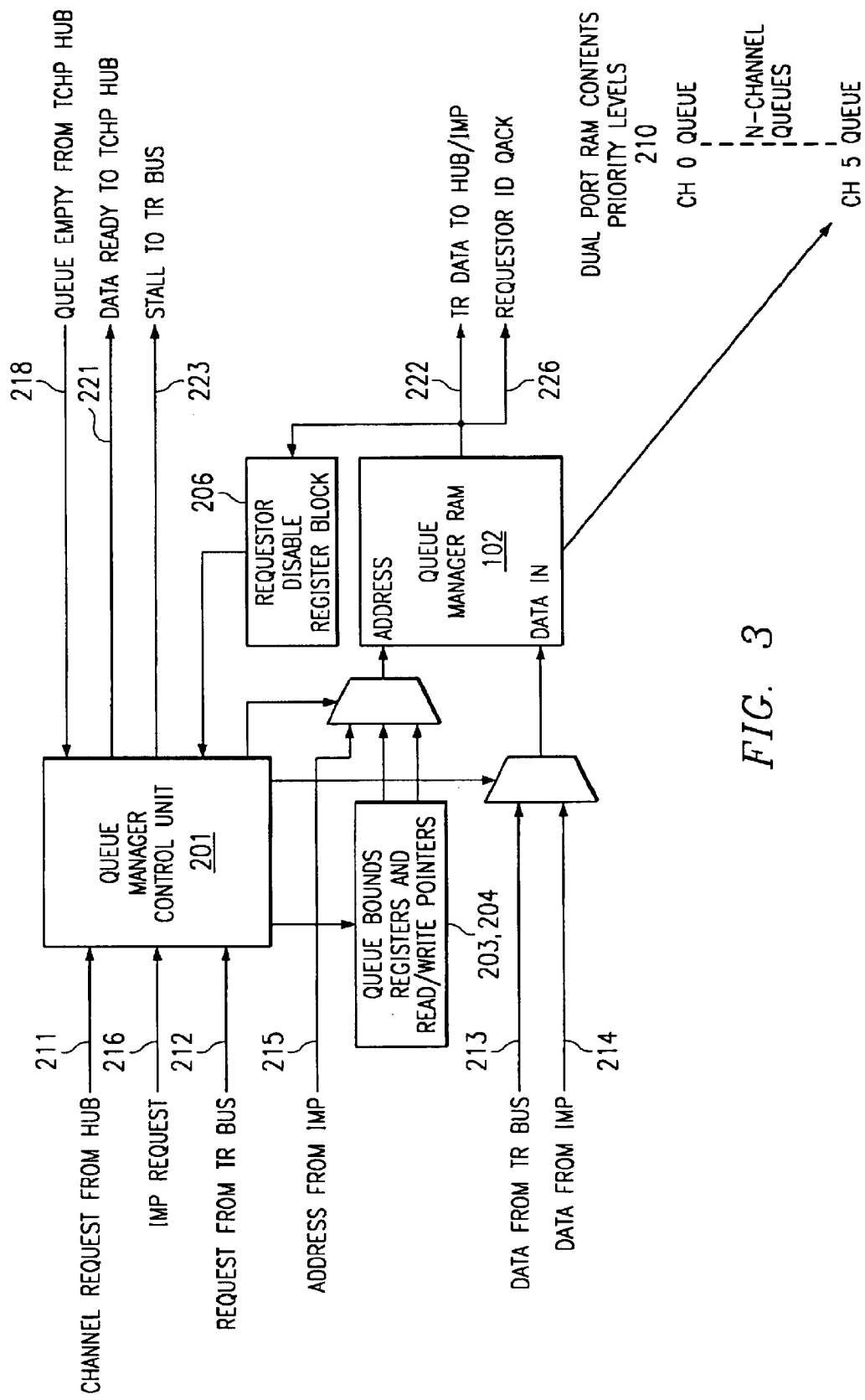
FIG. 3 illustrates the functional block diagram of the request queue manager.

Request queue manager 101, illustrated in FIG. 3, operates in conjunction with the transfer request bus 212 and handles incoming requests. Queue manager control unit 201 sorts these requests by their priorities and stores them in the queue manager memory 102. Queue manager memory 102 may take several forms, but is preferably random access memory (RAM) based.

Queue manager memory 102 may be partitioned into multiple queues. Each such queue represents a priority level with which access requests in that queue should be performed by the transfer controller hub. FIG. 3 shows six priority levels 210, labeled CH0 through CH5. The number of channels in request queue manager 101 is highly scalable, and controlled via a set of queue bounds registers 203 within request queue manager 101. The number of queue bounds registers determines the number of queues. Each queue within request queue manager 101 may be of different size, however each queue must contain at least enough memory space to store a single transfer request.

Request queue manager 101 also processes channel requests from the transfer controller hub 211 and supplies the next queued request to the hub on a per channel (1 channel per priority level) basis.

Request Queue Manager-Transfer Request (TR) Bus Interface

Transfer requests from the transfer request bus 212 sent to request queue manager 101 are sorted and stored in the queue manager memory 102 until the transfer controller hub can process them. A priority field of the first double word on an incoming transfer request determines its priority and is used to select into which of the queues the transfer request will be placed.

Write pointer logic, which is part of the queue bounds registers 203 and read/write pointer block 204, will increment the address only after each write and then only if the signal allowing queue manager memory 102 bypass is not active. If this increment causes the address to be equal to the next successive queue bounds value, then the next address will be reset to the original queue bounds value for that queue.

As an optional enhancement, it is possible to bypass request queue manager 101 when an incoming transfer request packet is addressed to a currently empty queue and the transfer controller hub channel to which that queue corresponds is idle. This condition is detected by comparing the read and write pointers for the appropriate queue. If the read and write pointers are equal, the queue channel is empty. Further inspection of the channel status within transfer controller hub 100 can detect the idle condition. Thus the transfer request parameters may be directly loaded into the transfer controller hub channel registers 120. This has the advantage of reducing latency on access requests. In the case of queue manager storage bypass, request queue manager 101 read and write pointers 204 for the appropriate channel are not incremented.

XRequest Queue Manager Hub Interface

Transfer controller hub 100 accepts the next entry in request queue manager 101 as soon as the respective channel becomes available (i.e. the previous request for that channel has completed). These reads are on a per-channel basis with the highest priority being serviced first. This requires a "data ready" signal 221 to be sent back to each of the channels indicating when the respective channel is being serviced by request queue manager 101. Data is sent to the transfer controller hub via the path 222 shown in FIG. 3. For each read from queue manager memory 102, the read pointer 204 is incremented except in the case of queue manager storage bypass as noted above.

Request queue manager 101 can issue only one store or one transfer request at a time. The "Channel Request from Hub" signal 211 has a priority level higher than the "Request from the TR Bus" signal 212. If there is a conflict between channel request from hub 211 and request from transfer request bus 212, the latter is interrupted until the channel request is served. Channel request service is allocated the CH0 priority level, which is the highest priority level, and is served first.

Request Queue Manager Requestor Disable

Requestor disable register block 206 is included in request queue manager 101. Transfer request "reads" that have a requestor ID that has been disabled via requester disable register block 206 will be ignored. Request queue manager 101 will continue to advance to the next request in the queue until one that is not disabled is located, or the queue is empty. Request disable register block 206 is memory mapped and can be accessed through internal memory port 115 illustrated in FIGS. 1 and 2.

Request Queue Manager Requestor ID Acknowledgement (QACK)

Request queue manager 101 has an extra duty to inform the transfer request nodes 116 when one of the transfer requests has been taken out of its priority queue and passed to the transfer controller hub for processing. This is required to notify the individual transfer request nodes 116 when reserved queue slots have freed up. Then transfer request nodes 116 can increment their counter value and issue another request if the counter was zero. The requestor ID QACK signal 226 is sent when it is read out of queue manager memory 102 for the transfer controller hub. The requester ID QACK signal 226 is passed along transfer request nodes 116 on another bus paralleling the transfer request bus. Each transfer request node 116 can verify that the requestor ID QACK was sent during that cycle and update their counters if applicable. A valid bit is included on this additional bus to qualify when the requestor ID was read out.

Request Queue Manager Datapath Summary

In summary, the datapath in request queue manager 101 consists of three main parts. The first is the queue manager control unit 201. This functional block takes in the channel request transfer request packet 211, transfer request node transfer request packet 212, and the queue manager "queue empty" 218 information from the hub. It then decodes the channel register transfer request packet, compares it with the "queue empty" information to check if any transfer request jilt packet is ready to be transferred. If there is a transfer packet and a "channel ready", queue manager control unit 201 then issues the channel number, issues a read enable to request queue manager 101 main data path to read the packets from queue manager RAM. If there is no transfer packet or "channel ready", queue manager control unit 201 will then do a transfer request write to queue manager memory 102 provided there is a transfer request. If there is a transfer request and a "channel ready", queue manager control unit 201 then issues the channel number and read enable to request queue manager 101 main data path to read the packets from queue manager memory 102 and also do the transfer request write to queue manager memory 102.

The second part of request queue manager 101 datapath is the main datapath. It has N read pointer counters and N write pointer counters for N queues, all a part of block 203/204. For this example N equals six because there are six priority levels. Based on whether a read or write operation is issued, request queue manager 101 datapath selects the read or write pointer of the corresponding queue. The datapath also detects whether the pointer will pass beyond the queue boundary. If the next address will go beyond the upper queue boundary, it will reset the next address to the lower queue boundary.

Request queue manager 101 main datapath also has N-1 queue bound registers, which may be globally memory mapped. These N-1 queue bound registers are also a part of queue bounds registers 203. The queue bounds registers define the lower and upper bounds of the N queues. When they are reset to a new value, both the corresponding read and write pointers are reset to the bottom of the queue immediately.

What is claimed is:

1. A method of prioritizing data transfer requests serviced by a centralized data transfer unit comprising the steps of:

receiving transfer request packets, each transfer request packet indicating a desired data transfer and a priority level within a hierarchy of a plurality of priority levels;

storing each received transfer request packet in a queue memory, each received transfer request packet stored in a first-in-first-out fashion within each priority level, said storing including storing each received transfer request packet in a random access memory fashion, defining an address range within said queue memory allocated to each priority level with a corresponding queue bounds register, storing a next input transfer request packet for a priority level at address within said queue memory indicated by a corresponding queue write pointer indicating address location, reading a next output transfer request packet for a priority level from an address within said queue memory indicated by a corresponding queue read pointer, dynamically defining said address range allocated to a priority level by dynamically writing to a corresponding queue bounds register;

detecting availability of free data transfer channel among a plurality of data transfer channels within said centralized data transfer processor; and dispatching a next transfer request packet in said first-in-first-out fashion to the corresponding free data transfer channel.

2. The method of claim 1, further comprising the steps of:

incrementing the corresponding queue write pointer upon storage of a transfer request packet in queue memory; and decrementing the corresponding queue read pointer upon transfer of a transfer request packet to a data transfer channel.

3. The method of claim 1, further comprising the steps of:

generating said transfer request packets at each of a plurality of transfer request nodes; and upon dispatching of a transfer request packet to a free data transfer channel, sending a queue acknowledge signal to said transfer request node originating said transfer request packet.

4. The method of claim 1, wherein:

the number of data transfer channels equals the number of priority levels.

5. A method of prioritizing data transfer requests serviced by a centralized data transfer unit comprising the steps of:

receiving transfer request packets, each transfer request packet indicating a desired data transfer and a priority level within a hierarchy of a plurality of priority levels;

storing each received transfer request packet in a queue memory each received transfer request packet stored in a first-in-first-out fashion within each priority level;

detecting availability of free data transfer channel among a plurality of data transfer channels within said centralized data transfer processor;

dispatching a next transfer request packet in said first-in-first-out fashion to the corresponding free data transfer channel;

detecting if a channel corresponding to a priority level within the queue is empty; and if a received transfer request packet es has a priority level detected to be empty;

bypassing storing said transfer request packet in said queue memory, and dispatching said transfer request packet directly to the corresponding free data transfer channel.

6. The method of claim 5, wherein:

said step of storing each received transfer request packet in a queue memory includes storing each received transfer request packet in a random access memory fashion, defining an address range within said queue memory allocated to each priority level with a corresponding queue bounds register, storing a next input transfer request packet for a priority level at address within said queue memory indicated by a corresponding queue write pointer indicating address location, and reading a next output transfer request packet for a priority level from an address within said queue memory indicated by a corresponding queue read pointer.

7. The method of claim 6, further comprising the steps of:

incrementing the corresponding queue write pointer upon storage of a transfer request packet in queue memory; memory and decrementing the corresponding queue read pointer upon transfer of a transfer request packet to a data transfer channel.

8. The method of claim 5, further comprising the steps of:

generating said transfer request packets at each of a plurality of transfer request nodes; and upon dispatching of a transfer request packet to a free data transfer channel, sending a queue acknowledge signal to said transfer request node originating said transfer request packet.

9. The method of claim 5, wherein:

the number of data transfer channels equals the number of priority levels.

10. A method of prioritizing data transfer requests serviced by a centralized data transfer unit comprising the steps of:

receiving transfer request packets, each transfer request packet indicating a desired data transfer and a priority level within a hierarchy of a plurality of priority levels;

storing each received transfer request packet in a queue memory, each received transfer request packet stored in a first-in-first-out fashion within each priority level;

detecting availability of free data transfer channel among a plurality of data transfer channels within said centralized data transfer processor;

dispatching a next transfer request packet in said first-in-first-out fashion to the corresponding free data transfer channel;

generating said transfer request packets at each of a plurality of transfer request nodes, said transfer request packet identifying an originating transfer request node;

disabling dispatching transfer request packets originating from selected transfer request nodes; and ignoring transfer request packets originating from disabled transfer request nodes.

11. The method of claim 10, wherein:

said step of disabling dispatching transfer request packets originating from selected transfer request nodes includes writing at least one to a corresponding location within a request disable register.

12. The method of claim 10, wherein:

said step of storing each received transfer request packet in a queue memory includes storing each received transfer request packet in a random access memory fashion, defining an address range within said queue memory allocated to each priority level with a corresponding queue bounds register, storing a next input transfer request packet for a priority level at address within said queue memory indicated by a corresponding queue write pointer indicating address location, and reading a next output transfer request packet for a priority level from an address within said queue memory indicated by a corresponding queue read pointer.

13. The method of claim 12, further comprising the steps of:

incrementing the corresponding queue write pointer upon storage of a transfer request packet in queue memory; memory and decrementing the corresponding queue read pointer upon transfer of a transfer request packet to a data transfer channel.

14. The method of claim 10, further comprising the steps of:
generating said transfer request packets at each of a plurality of transfer request nodes; and
upon dispatching of a transfer request packet to a free data transfer channel, sending a queue acknowledge signal to said transfer request node originating said transfer request packet.

15. The method of claim 10, wherein:
the number of data transfer channels equals the number of priority levels.

16. The method of prioritizing data transfer requests serviced by a centralized data transfer unit comprising the steps of:
receiving transfer request packets, each transfer request packet indicating a desired data transfer and a priority level within a hierarchy of a plurality of priority levels;
storing each received transfer request packet in a queue memory, each received transfer request packet stored in a first-in-first-out fashion within each priority level;
detecting availability of free data transfer channel among a plurality of data transfer channels within said centralized data transfer processor;
dispatching a next transfer request packet in said first-in-first-out fashion to the corresponding free data transfer channel;
generating said transfer request packets at each of a plurality of transfer request nodes; and
upon dispatching of a transfer request packet to a free data transfer channel, sending a queue acknowledge signal to said transfer request node originating said transfer request packet.

17. The method of claim 16, wherein:
said step of storing each received transfer request packet in a queue memory includes
storing each received transfer request packet in a random access memory fashion,
defining an address range within said queue memory allocated to each priority level with a corresponding queue bounds register,
storing a next input transfer request packet for a priority level at address within said queue memory indicated by a corresponding queue write pointer indicating address location, and
reading a next output transfer request packet for a priority level from an address within said queue memory indicated by a corresponding queue read pointer.

18. The method of claim 17, further comprising the steps of:
incrementing the corresponding queue write pointer upon storage of a transfer request packet in queue memory; memory and
decrementing the corresponding queue read pointer upon transfer of a transfer request packet to a data transfer channel.

19. The method of claim 16, wherein:
the number of data transfer channels equals the number of priority levels.

* * * * *